United States Patent
Kato (10) Patent No.: US 9,896,108 B2
(45) Date of Patent: Feb. 20, 2018

(54) VEHICLE CONTROL DEVICE

(71) Applicant: MITSUBISHI JIDOSHA KOGYO KABUSHIKI KAISHA, Tokyo (JP)

(72) Inventor: Tomo Kato, Chiryu (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/166,892

(22) Filed: May 27, 2016

(65) Prior Publication Data

US 2016/0272209 A1    Sep. 22, 2016

Related U.S. Application Data

(63) Continuation of application No. PCT/JP2014/080644, filed on Nov. 19, 2014.

(30) Foreign Application Priority Data

Nov. 29, 2013  (JP) .................................. 2013-247334

(51) Int. Cl.
*B60W 30/182*    (2012.01)
*F02N 11/08*    (2006.01)
(Continued)

(52) U.S. Cl.
CPC .......... *B60W 30/182* (2013.01); *B60W 10/06* (2013.01); *B60W 10/10* (2013.01);
(Continued)

(58) Field of Classification Search
None
See application file for complete search history.

(56) References Cited

U.S. PATENT DOCUMENTS

| 4,817,753 A | 4/1989 | Hiketa |
| 5,409,429 A | 4/1995 | Showalter et al. |

(Continued)

FOREIGN PATENT DOCUMENTS

| EP | 1355209 A1 | 10/2003 |
| GB | 2486453 A | 6/2012 |

(Continued)

OTHER PUBLICATIONS

Landrover Technical Communications, "Stop/Start," Freelander 2 Owner's Handbook, Publication Part No. LRL 10 02 56 101, XP-002686551, Jan. 1, 2009, pp. 100-101 (4 pages total).

*Primary Examiner* — Colby M Hansen
(74) *Attorney, Agent, or Firm* — Birch Stewart Kolasch & Birch, LLP (57) ABSTRACT

In a 2H mode of two-wheel drive and a 4H mode of four-wheel drive, a driver does not put much importance on traveling performance on a rough road. Therefore, implementation of both of idling-stop control and neutral control is permitted. Compared with the 4H mode, in a 4HLc mode for limiting differential motions of a center differential gear and a rear differential gear, it can be regarded that the driver puts importance on the traveling performance on the rough road. Therefore, the implementation of the idling-stop control is prohibited and the implementation of the neutral control is permitted. In a 4LLc mode for switching a sub-reduction gear to a low gear side compared with the 4HLc mode, since it can be regarded that the driver puts more importance on the traveling performance on the rough road, both of the implementation of the idling stop control and the implementation of the neutral control are prohibited.

16 Claims, 2 Drawing Sheets

(51) Int. Cl.
- *B60W 10/06* (2006.01)
- *B60W 10/14* (2012.01)
- *B60W 30/02* (2012.01)
- *F02D 17/00* (2006.01)
- *B60W 10/10* (2012.01)
- *B60W 10/16* (2012.01)

(52) U.S. Cl.
CPC ............ *B60W 10/14* (2013.01); *B60W 10/16* (2013.01); *B60W 30/02* (2013.01); *F02D 17/00* (2013.01); *F02N 11/0833* (2013.01); *F02N 2200/08* (2013.01); *F02N 2200/124* (2013.01); *Y02T 10/48* (2013.01)

(56) References Cited

U.S. PATENT DOCUMENTS

| | | | |
|---|---|---|---|
| 2012/0088632 A1* | 4/2012 | Zhang | B60W 10/06 477/52 |
| 2012/0316740 A1 | 12/2012 | Funakoshi et al. | |
| 2013/0151057 A1 | 6/2013 | Matsubara et al. | |
| 2015/0314775 A1* | 11/2015 | Dextreit | B60W 20/19 701/22 |

FOREIGN PATENT DOCUMENTS

| | | |
|---|---|---|
| JP | 63-61637 A | 3/1988 |
| JP | 4-212635 A | 8/1992 |
| JP | 7-76234 A | 3/1995 |
| JP | 2000-261909 A | 9/2000 |
| JP | 2001-122095 A | 5/2001 |
| JP | 2003-156133 A | 5/2003 |
| JP | 2005-337321 A | 12/2005 |
| JP | 2007-302211 A | 11/2007 |
| JP | 2008-213699 A | 9/2008 |
| JP | 2012-255383 A | 12/2012 |
| JP | 2012-255492 A | 12/2012 |
| WO | WO 2012/026044 A1 | 3/2012 |
| WO | WO 2012/123555 A1 | 9/2012 |
| WO | WO 2013/037777 A1 | 3/2013 |

* cited by examiner

| ACTUATOR \ TRAVELING MODE | 2H | 4H | 4HLc | 4LLc |
|---|---|---|---|---|
| 2WD/4WD SWITCHING MECHANISM | DISCONNECT | | CONNECT | |
| FREE WHEEL HUB | DISCONNECT | | CONNECT | |
| CENTER LOCK MECHANISM | UNLOCK | | LOCK | |
| SUB-REDUCTION GEAR | | Hi | | Lo |
| REAR LOCK MECHANISM | UNLOCK | | UNLOCK/LOCK | |
| IDLING STOP CONTROL | PERMIT | | PROHIBIT | |
| NEUTRAL CONTROL | | PERMIT | | PROHIBIT |

VEHICLE CONTROL DEVICE

CROSS REFERENCE TO RELATED APPLICATIONS

This application is a Continuation of PCT International Application No. PCT/JP2014/080644, filed on Jun. 4, 2015, which claims priority under 35 U.S.C. 119(a) to Patent Application No. 2013-247334, filed in Japan on Nov. 19, 2014, all of which are hereby expressly incorporated by reference into the present application.

BACKGROUND OF THE INVENTION

Technical Field

The present invention relates to a vehicle control device and, more specifically, to a vehicle control device capable of optionally switching a plurality of traveling modes in different transmission states of an engine output to driving wheels and having an idling stop function for automatically stopping an engine when a vehicle stops and automatically starting the engine in starting the vehicle thereafter.

Related Art

A four-wheel drive vehicle has been spread that distributes an output of an engine to front wheels and rear wheels to improve off-road traveling performance, a low μ road, and the like (hereinafter sometimes generally referred to as rough road as well) and driving both of the front wheels and the rear wheels to travel. For example, a part-time type four-wheel driving vehicle described in Japanese Patent Application Laid-Open No. H4-212635 is configured to distribute an engine output input to a transfer via a sub-reduction gear to a front wheel side and a rear wheel side while allowing a differential motion with a center differential gear. A 2WD/4WD switching mechanism for transmitting or interrupting power is interposed between the center differential gear and the rear wheels. A lock mechanism for limiting the differential motion is attached to the center differential gear.

The 2WD/4WD switching mechanism and the lock mechanism operate according to a traveling mode selected by a driver. For example, when a two-wheel drive mode is selected as the traveling mode, the 2WD/4WD switching mechanism is switched to a disconnected position and the vehicle travels with driving of only the rear wheels. When a four-wheel drive mode is selected, the 2WD/4WD switching mechanism is switched to a connected position, the lock mechanism is switched to an unlock position, and the vehicle travels with driving of the front wheels and the rear wheels in a state in which a differential motion between the front and rear wheels is allowed. When a four-wheel drive lock mode is selected, the 2WD/4WD switching mechanism is switched to the connected position, the lock mechanism is switched to a lock position, and the vehicle travels with driving of the front wheels and the rear wheels in a state in which the differential motion between the front and rear wheels is limited.

On the other hand, in recent years, for the purpose of, for example, improvement of fuel consumption performance, a vehicle including an idling stop function for automatically stopping and automatically starting an engine in waiting for a green light. For example, in techniques described in Japanese Patent Application Laid-Open No. 2012-255383 and Japanese Patent Application Laid-Open No. 2012-255492, an engine is automatically stopped when both of predetermined stop conditions, for example, vehicle speed=0 and brake ON are satisfied and the engine is automatically started when predetermined restart conditions, for example, brake OFF are satisfied in starting the vehicle thereafter.

Incidentally, although the idling stop function is desirable in terms of the fuel efficiency performance, there is some room of improvement from the viewpoint of convenience for a driver, for example, the start of the vehicle is sometimes slightly delayed because of the engine automatic start. It is not completely unlikely that the stopped engine cannot be automatically started, that is, the vehicle falls into a start impossible situation.

Naturally, the idling stop function is sometimes mounted on the four-wheel drive vehicle. Compared with the general two-wheel drive vehicle, the four-wheel drive vehicle is more often used in, for example, traveling on a rough road because of characteristics of the four-wheel drive vehicle. More careful drive operation is required on the rough road than on the general road. Inappropriate drive operation sometimes directly leads to a trouble such as a stuck vehicle. Therefore, if the engine is automatically stopped by the idling stop function in every stop of the vehicle during traveling on such a rough road, it is likely that more important traveling of the vehicle is hindered.

For example, immediately before entering an undulating off-road, the driver often stop the vehicle to learn the forward geography. When the engine is automatically stopped every time the vehicle is stopped, the vehicle cannot be smoothly started. When the vehicle is stuck in a muddy ground, the vehicle needs to be gently started to escape from the stuck state. However, the engine immediately after the automatic start is inappropriate for such drive operation because torque suddenly rises and induces a slip of driving wheels. If the stopped engine cannot be automatically started because of some cause, it is impossible to escape from the stuck state.

In general, the idling stop function can be optionally cancelled by switch operation. However, it is complicated to perform the switch operation every time. A driver who loses peace of mind because of the stuck state or the like sometimes does not notice a countermeasure. There has been a demand for drastic measures on the vehicle side.

SUMMARY OF THE INVENTION

The present invention has been devised to solve such problems and an object of the present invention is to provide a vehicle control device that can automatically and appropriately prohibit an idling stop function during traveling on a rough road or the like to thereby prevent deterioration in traveling performance of a vehicle on the rough road due to inappropriate automatic stop of an engine.

In order to attain the object, a vehicle control device comprising: a mode switching section that switches a transmission state of an engine output to driving wheels of the vehicle between at least two modes, that is, a first traveling mode and a second traveling mode more suitable for rough road traveling than the first traveling mode; an idling-stop control section that automatically stops the engine when a predetermined stop condition is satisfied and restarts the automatically stopped engine when a predetermined restart condition is satisfied; and a permitting/prohibiting section that permits the automatic stop of the engine by the idling-stop control section when the transmission state is switched to the first traveling mode by the mode switching section and prohibits the automatic stop of the engine by the idling-stop control section when the transmission state is switched to the second traveling mode by the mode switching section, wherein the vehicle is a vehicle including a lock mechanism capable of limiting a differential motion between front and rear wheels or left and right wheels, the first traveling mode is an unlock mode for allowing the differential motion between the front and rear wheels or the left and right wheels with the lock mechanism, and the second traveling mode is a lock mode for limiting the differential motion between the front and rear wheels or the left and right wheels with the lock mechanism.

According to the vehicle control device of the present invention, traveling is more likely the rough road traveling when the transmission state is switched to the second traveling mode compared with the first traveling mode. It can be regarded that the driver puts more importance on traveling performance on a rough road than on fuel consumption performance. Therefore, by prohibiting the idling stop control, it is possible to prevent a harmful effect at the time when the idling stop control is implemented during the traveling of the vehicle on the rough road. It is possible to improve convenience for the driver. Since the engine is not automatically stopped even if the vehicle stops, it is possible to reduce a risk that the stopped engine cannot be restarted and the vehicle falls into start impossibility on the rough road. Therefore, it is possible to realize run-through performance of the vehicle on the rough road to the maximum.

Compared with the unlock mode, in the lock mode, it can be regarded that the driver puts importance on the traveling performance on the rough road. Therefore, it is possible to more surely improve the convenience for the driver.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment in which the present invention is embodied as a control device for a part-time type four-wheel drive vehicle is explained.

Figure 1:
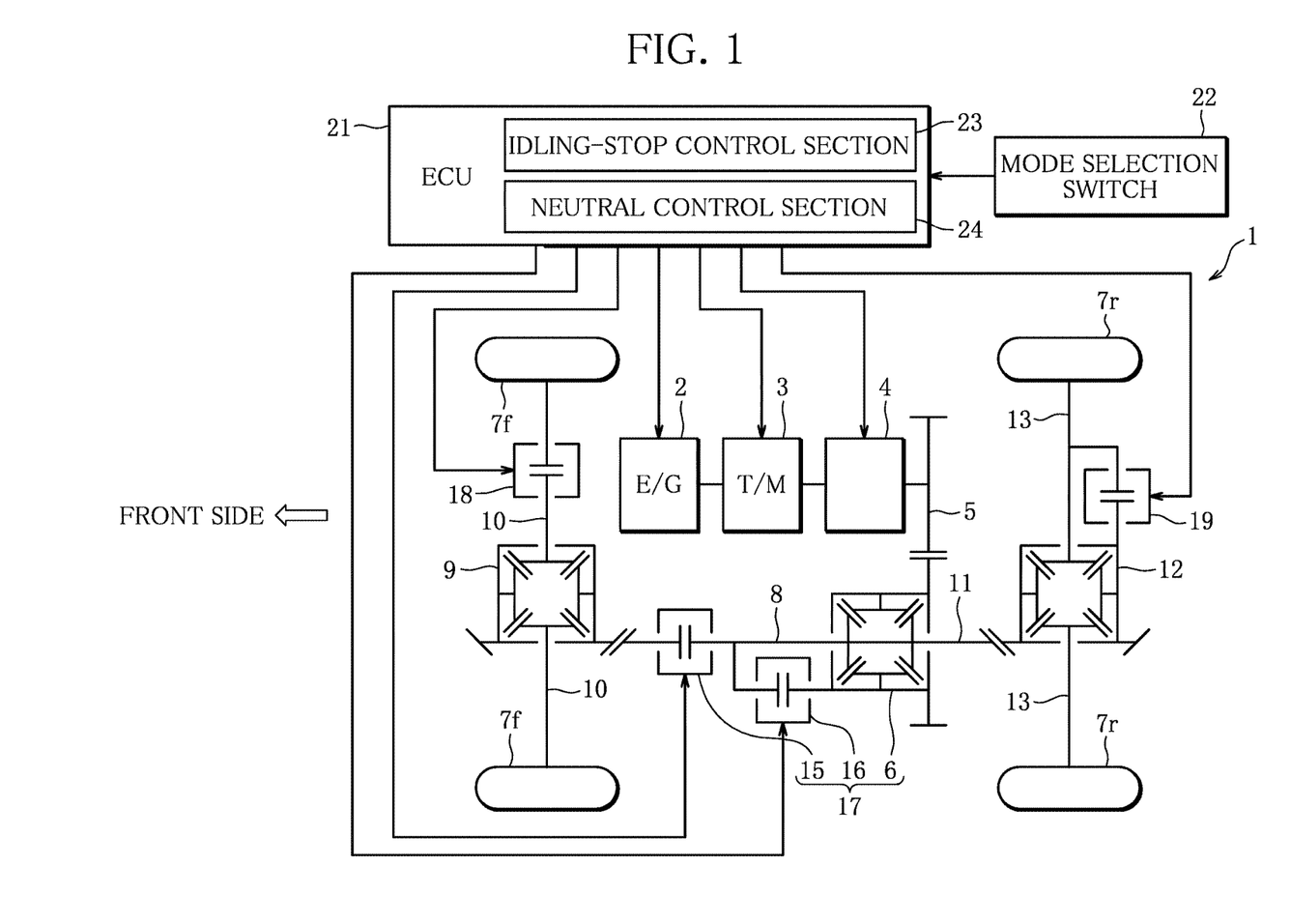
FIG. 1 is an overall configuration diagram showing a control device for a part-time type four-wheel drive vehicle in an embodiment.

FIG. 1 is an overall configuration diagram showing the control device for the part-time type four-wheel drive vehicle in this embodiment.

A sub-reduction gear 4 is coupled to, via a transmission 3, an engine 2 mounted on a vehicle 1. A center differential gear 6 is coupled to the sub-reduction gear 4 via a transmission mechanism 5. An output of the engine 2 is input to the center differential gear 6 from the transmission 3 through the sub-reduction gear 4 and the transmission mechanism 5 and distributed to a front wheel 7f side and a rear wheel 7r side with a differential motion being allowed by the center differential gear 6.

A front differential gear 9 is coupled to a front-side output section of the center differential gear 6 via a front propeller shaft 8. Left and right front wheels 7f are coupled to the front differential gear 9 via a drive shaft 10. The engine output distributed from the center differential gear 6 to the front wheel 7f side is input to the front differential gear 9 via the front propeller shaft 8 and distributed to the left and right with a differential motion being allowed by the front differential gear 9 to respectively drive the front wheels 7f.

A rear differential gear 12 is coupled to a rear-side output section of the center differential gear 6 via a rear propeller shaft 11. Left and right rear wheels 7r are coupled to the rear differential gear 12 via a drive shaft 13. The engine output distributed from the center differential gear 6 to the rear wheel 7r side is input to the rear differential gear 12 via the rear propeller shaft 11 and distributed to the left and right with a differential motion being allowed by the rear differential gear 12 to respectively drive the rear wheels 7r.

A 2WD/4WD switching mechanism 15 is provided in the front propeller shaft 8. The 2WD/4WD switching mechanism 15 is switchable between two positions of a connected position and a disconnected position by driving of a not-shown actuator. When the 2WD/4WD switching mechanism 15 is in the connected position, power from the center differential gear 6 is transmitted to the front differential gear 9 side via the 2WD/4WD switching mechanism 15. The front wheels 7f and the rear wheels 7r are driven and the vehicle 1 performs 4WD traveling (a four-wheel drive mode). When the 2WD/4WD switching mechanism 15 is in the disconnected position, the power from the center differential gear 6 is interrupted by the 2WD/4WD switching mechanism 15 and is not transmitted to the front differential gear 9 side. The driving of the front wheels 7f is stopped and the vehicle 1 performs 2WD traveling (a two-wheel drive mode).

A center lock mechanism 16 is attached to the center differential gear 6. The center lock mechanism 16 is switchable between two positions of an unlock position and a lock position by driving of a not-shown actuator. When the center lock mechanism 16 is in the unlock position during the 4WD traveling of the vehicle 1, a differential motion between the front wheel 7f side and the rear wheel 7r side is allowed by the center differential gear 6. A rotation difference between the front and rear wheels 7f and 7r that occurs, for example, during turning of the vehicle 1 is absorbed (an unlock mode). When the center lock mechanism 16 is in the lock position during the 4WD traveling, a differential motion of the center differential gear 6 is limited and run-through performance of the vehicle 1 on a rough road is improved (a lock mode).

A transfer 17 of the vehicle 1 is configured by the center differential gear 6, the 2WD/4WD switching mechanism 15, and the center lock mechanism 16 explained above.

A free wheel hub 18 is provided in the drive shaft 10 of the front wheels 7f. The free wheel hub 18 is switchable between two positions of a connected position and a disconnected position by the driving of the not-shown actuator. When the free wheel hub 18 is in the connected position, the front differential gear 9 and the front wheels 7f are coupled and power transmission to the front wheels 7f is enabled. When the free wheel hub 18 is in the disconnected position, the front differential gear 9 and the front wheels 7f are disconnected. When the free wheel hub 18 is switched to the disconnected position in the 2WD traveling, rotation resistance of the front differential gear 9 and the front propeller shaft 8 caused by reverse driving from the front wheels 7f and traveling resistance of the vehicle 1 are reduced.

A rear lock mechanism 19 is attached to the rear differential gear 12. The rear lock mechanism 19 is switchable between two positions of an unlock position and a lock position by the driving of the not-shown actuator. When the rear lock mechanism 19 is in the lock position, a differential motion between the left and right rear wheels 7r is allowed by the rear differential gear 12. A rotation difference between the left and right rear wheels 7r caused, for example, during the turning of the vehicle 1 is allowed. When the rear lock mechanism 19 is in the lock position, a differential motion of the rear differential gear 12 is limited and the run-through performance of the vehicle 1 on the rough road is improved.

On the other hand, the sub-reduction gear 4 is configured to be switchable between two positions of a Hi position on a high gear side and a Lo position on a low gear side by the driving of the not-shown actuator. An engine output transmitted from the transmission 3 to the sub-reduction gear 4 is input to the center differential gear 6 after being reduced at a reduction ratio on the high gear side when the sub-reduction gear 4 is in the Hi position (a high mode). The engine output is input to the center differential gear 6 after being reduced at a reduction ratio on the low gear side when the sub-reduction gear 4 is in the Lo position (a low gear mode).

Compared with the Hi position, when the sub-reduction gear 4 is switched to the Lo position, rotation speed of the driving wheels further decreases and adjustment of a driving force is facilitated even at the same engine speed. Therefore, when the vehicle 1 is started in, for example, a muddy ground, it is possible to suppress a slip of the driving wheels and perform a smooth start by switching the reduction gear to the Lo position.

An ECU 21 is set in the interior of the vehicle 1. The ECU 21 includes an input/output device, a storage device (a ROM, a RAM, etc.) served for storage of a control program, a control map, and the like, a central processing unit (CPU), and a timer counter, which are not shown in the figure. Although not shown in the figure, various sensors such as an accelerator sensor that detects an accelerator operation amount, a vehicle speed sensor that detects vehicle speed, and a wheel speed sensor that detects rotation speed of the front and rear wheels 7f and 7r are connected to an input side of the ECU 21. In addition, a mode selection switch 22 (an input member) that selects a traveling mode of the vehicle 1 is connected to the input side of the ECU 21. The engine 2 and the transmission 3 are connected to an output side of the ECU 21. In addition, the actuators of the sub-reduction gear 4, the 2WD/4WD switching mechanism 15, the center lock mechanism 16, the free wheel hub 18, and rear lock mechanism 19 are connected to the output side of the ECU 21.

The ECU 21 implements operation control of the engine 2 and transmission control of the transmission 3 on the basis of detection information from such various sensors.

The ECU 21 includes an idling-stop control section 23 (an idling-stop control section). The ECU 21 implements idling stop control according to processing by the idling-stop control section 23. The idling stop control is processing for automatically stopping the engine 2 on the basis of satisfaction of predetermined stop conditions when the traveling vehicle 1 stops and automatically starting the engine 2 on the basis of satisfaction of predetermined restart conditions thereafter. During the implementation of the idling top control, prevention of idling operation of the engine 2 during the vehicle stop contributes to a fuel consumption reduction.

Note that, as the stop conditions, besides basic conditions such as vehicle speed=0 and brake ON, a state of hydraulic oil pressure of the brake, a temperature state of the engine 2, an SOC (State Of Charge) of a battery, an actuation request for an air conditioner, an acceleration operation amount, and the like are set. As the restart conditions, brake OFF and the like are set.

The ECU 21 includes a neutral control section 24 (a neutral control section). The ECU 21 implements neutral control according to processing by the neutral control section 24. The neutral control is processing for automatically keeping the transmission 3 in a neutral state on the basis of satisfaction of predetermined neutral conditions during the stop of the vehicle 1. During the implementation of the neutral control, a reduction in an engine load contributes to a fuel consumption reduction.

On the other hand, the ECU 21 determines the traveling mode of the vehicle 1 on the basis of a selection position of the mode selection switch 22 and, in order to cause the vehicle 1 to travel according to the traveling mode, drive-controls the actuators of the sub-reduction gear 4, the 2WD/4WD switching mechanism 15, the center lock mechanism 16, the free wheel hub 18, and the rear lock mechanism 19. Such control of the actuators by the ECU 21 is executed according to a table shown in FIG. 2. The control is explained below.

Figure 2:
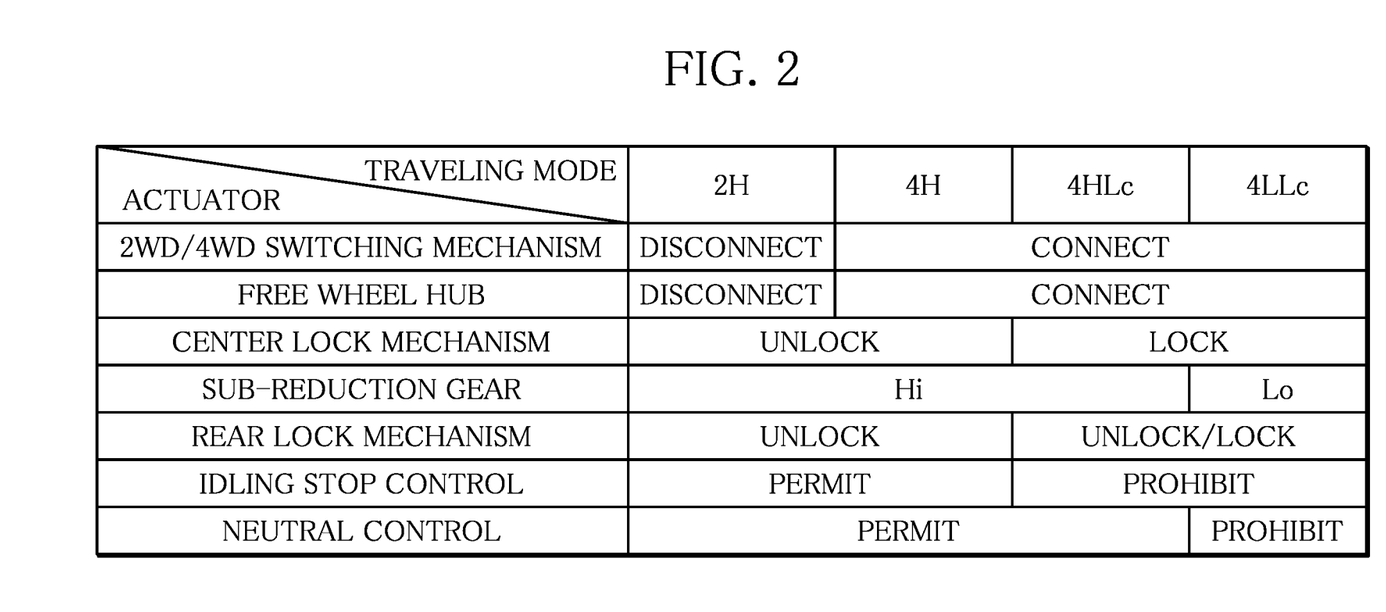
FIG. 2 is a diagram showing switching states of traveling modes and permission/prohibition states of idling stop control and neutral control.

The mode selection switch 22 is switchable among four kinds of traveling modes, that is, a 2H mode, a 4H mode, a 4HLc mode, and a 4LLc mode. Any one of the traveling modes is selected by the driver.

In the 2H mode, the 2WD/4WD switching mechanism 15 is switched to the disconnected position and the vehicle 1 performs 2WD traveling according to driving of only the rear wheels 7r. In order to reduce rotation resistance of the front differential gear 9 and the front propeller shaft 8 during the 2WD traveling, the free wheel hub 18 is switched to the disconnected position. The center lock mechanism 16 is switched to the unlock position. A differential motion between the front wheel 7f side and the rear wheel 7r side is allowed by the center differential gear 6. The rear lock mechanism 19 is switched to the unlock position. A differential motion between the left and right rear wheels 7r is allowed by the rear differential gear 12. The sub-reduction gear 4 is switched to the Hi position. The 2H mode is selected during normal traveling on a paved road, a flat unpaved road, and the like.

The 2H mode explained above is equivalent to the first traveling mode, the two-wheel drive mode, the unlock mode, and the high gear mode of the present invention.

When the traveling mode shifts from the 2H mode to the 4H mode, the 2WD/4WD switching mechanism 15 and the free wheel hub 18 are respectively switched to the connected positions. Power from the center differential gear 6 is transmitted to the front wheels 7f via the 2WD/4WD switching mechanism 15 and the free wheel hub 18. The vehicle 1 performs 4WD traveling according to driving of the front wheels 7f and the rear wheels 7r. Since the front and rear wheels 7f and 7r function as driving wheels, the run-through performance of the vehicle 1 is improved in the 4H mode compared with the 2H mode. The vehicle 1 has a traveling characteristic suitable for traveling on the rough road. Therefore, the 4H mode is selected, for example, during traveling on an off-road with gentle undulation or during traveling in rain.

The 4H mode explained above is equivalent to the first traveling mode, the unlock mode, and the high gear mode of the present invention.

When the traveling mode shifts from the 4H mode to the 4HLc mode, the center lock mechanism 16 is switched from the unlock position to the lock position. The rear lock mechanism 19 is switched between the unlock position and the lock position on the basis of a traveling state of the vehicle 1, for example, a slip state of the left and right rear wheels 7r. According to differential motion limitation of the center differential gear 6 and differential motion limitation of the rear differential gear 12 performed as appropriate, the run-through performance of the vehicle 1 is further improved in the 4HLc mode than in the 4H mode. The vehicle 1 has a traveling characteristic suitable for rough road traveling. Therefore, the 4HLc mode is selected during traveling on an undulating rough road or during traveling in snowfall.

The 4HLc mode explained above is equivalent to the second traveling mode, the four-wheel drive mode, the lock mode, and the fourth traveling mode of the present invention.

When the traveling mode shifts from the 4HLc mode to the 4LLc mode, the sub-reduction gear 4 is switched from the Hi position to the Lo position. The rotation speed of the front and rear wheels 7f and 7r of the vehicle 1 decreases and adjustment of a driving force is facilitated. Therefore, the run-through performance of the vehicle 1 is further improved in the 4LLc mode than in the 4HLc mode. The vehicle 1 has a traveling characteristic suitable for rough road traveling. Therefore, the 4LLc mode is selected, for example, during traveling in a muddy ground or when the vehicle 1 is caused to escape from a stuck state.

The 4LLc mode explained above is equivalent to the second traveling mode, the four-wheel drive mode, the lock mode, the low gear mode, and the third traveling mode of the present invention.

Incidentally, as described in [Problems to be Solved by the Invention], when the engine 2 is automatically stopped by the idling stop control every time the vehicle 1 stops during traveling on the rough road, it is likely that the traveling of the vehicle 1 is hindered. It is also likely that the stopped engine 2 cannot be automatically started because of some cause and the vehicle 1 falls into a situation in which the vehicle 1 cannot start. The same applies to the neutral control. When the transmission 3 is released from the neutral state in the start of the vehicle 1, transmitted power to the driving wheel side suddenly rises and easily induces a slip of the driving wheels. In the case of the rough road, this could cause a stuck state. Therefore, during the traveling on the rough road, it is necessary to automatically and appropriately prohibit the idling stop control and the neutral control.

In view of such a deficiency, the inventor focused on the point that the traveling mode selected by the driver with the mode selection switch 22 correlates to the run-through performance of the vehicle 1 on the rough road, possibility of rough road traveling is higher when the traveling mode with high run-through performance is selected, and the driver puts more importance on traveling performance on the rough road than on fuel consumption performance. Under this viewpoint, in this embodiment, permission/prohibition of the idling stop control and the neutral control is determined using, as an index, the traveling mode selected by the mode selection switch 22. Processing executed by the ECU 21 is explained below.

As shown in FIG. 2, in the 2H mode and the 4H mode, both of implementation of the idling stop control and implementation of the neutral control are permitted. A selection position of the mode selection switch 22 and a switching state of the traveling mode always correspond to each other. Therefore, permission/prohibition of the idling stop control and the neutral control may be determined on the basis of the selection position of the mode selection switch 22 or may be determined on the basis of the traveling mode itself actually switched.

As explained above, for example, the 2H mode is selected during traveling on a paved road, a flat unpaved road, and the like. The 4H mode is selected during traveling on an off-road with little undulation and in rain. It is hard to say that these traveling conditions indicate an extreme rough road. Therefore, it can be regarded that the driver does not put much importance on traveling performance on the rough road when the 2H mode or the 4H mode is selected. In general, most of traveling conditions encountered by the vehicle 1 correspond to any one of these traveling conditions. Therefore, to obtain a sufficient fuel consumption reduction effect, it is desirable to implement the idling stop control and the neutral control at this point. Even if both the kinds of control are implemented, the traveling performance of the vehicle 1 is not hindered.

Therefore, in the 2H mode and the 4H mode, the fuel consumption reduction effect can be sufficiently obtained according to both of the implementation of the idling stop control and the implementation of the neutral control.

In the 4HLc mode, the implementation of the idling stop control, that is, the automatic stop of the engine 2 based on the stop conditions is prohibited and the implementation of the neutral control is permitted. Compared with the 2H mode and the 4H mode, when the 4HLc mode is selected, differential motion limitation of the center differential gear 6 and the rear differential gear 12 is performed. The traveling characteristic of the vehicle 1 is more suitable for the rough road. In other words, when the 4HLc mode is selected, compared with when the 2H mode and the 4H mode are selected, it can be regarded that the driver puts more importance on traveling performance on the rough road.

On the other hand, as opposed to the neutral control that tends to induce a slip of the driving wheels during the start of the vehicle 1 on the rough road, when the idling stop control is implemented during traveling on the rough road, a more serious problem of start impossibility occurs when the engine 2 cannot be automatically started. Therefore, only the idling stop control is prohibited in the 4HLc mode.

Consequently, it is possible to prevent various harmful effects at the time when the idling stop control is implemented during the traveling of the vehicle 1 on the rough road. For example, even if the vehicle 1 stops on the rough road, it is possible to smoothly start the vehicle 1 because the operation of the engine 2 is continued. Even during escape from a stuck state, since engine torque gently rises from idling operation, it is possible to smoothly start the vehicle 1 while suppressing a slip of the driving wheels. Therefore, it is possible to improve convenience for the driving during the rough road traveling.

Further, naturally, the engine 2 is not automatically stopped even if the vehicle 1 stops. Therefore, it is possible to reduce a risk that the stopped engine 2 cannot be automatically started and the vehicle 1 falls into start impossibility on the rough road. Therefore, it is possible to realize the run-through performance of the vehicle 1 by the 4HLc mode on the rough road to the maximum.

In the 4HLc mode, the neutral control is implemented. Therefore, a fuel consumption reducing effect by the neutral control is obtained. It is possible to improve fuel consumption performance even during the rough road traveling.

On the other hand, in the 4LLc mode, both of implementation of the idling stop control and implementation of the neutral control are prohibited. Compared with the 4HLc mode, when the 4LLc mode is selected, the sub-reduction gear 4 is switched from the Hi position to the Lo position. The traveling characteristic of the vehicle 1 is more suitable for the rough road. In other words, when the 4LLc mode is selected, compared with when the 2HLc mode is selected, it can be regarded that the driver puts more importance on the traveling performance on the rough road. Therefore, the neutral control is also prohibited in order to further prioritize the traveling performance.

Therefore, it is possible to reduce harmful effects at the time when the neutral control is implemented during the traveling of the vehicle 1 on the rough road, for example, a risk that a slip of the driving wheels is inducted and the vehicle 1 falls into a stuck state when the vehicle 1 is started. Therefore, it is possible to further improve the convenience for the driver during the rough road traveling. In addition, it is possible to realize the run-through performance by the 4LLc mode on the rough road to the maximum.

Incidentally, in the vehicle 1 in this embodiment, the selection of the traveling mode is left to the driver. Therefore, in some case, the mode selection switch 22 is switch-operated by the driver in the automatic stop of the engine 2 by the idling stop control and the traveling mode is selected again. As a normal procedure in this case, the traveling mode is immediately switched according to a selected position of the mode selection switch 22 and, thereafter, the engine 2 is automatically started on the basis of satisfaction of the restart conditions.

The engine 2 is automatically stopped by the idling stop control in the case of the 2H mode or the 4H mode. The traveling mode is switched from one of the 2H mode and the 4H mode to another traveling mode. An actuator actuated at this point is different depending on the traveling modes before and after the switching. However, in any case, electric power of the battery mounted on the vehicle 1 is consumed for the actuation of the actuator.

As explained above, requirements concerning the SOC of the battery is also included in the stop conditions of the idling stop control. However, an expected situation such as consumption of a large amount of electric power by the actuator could occur. In such a case, when the engine 2 is automatically started thereafter, it is likely that a cell motor cannot be normally actuated because of power shortage of the battery and the vehicle 1 falls into engine start impossibility.

Therefore, in this embodiment, even when the mode selection switch 22 is operated in the automatic stop of the engine 2, the ECU 21 executes automatic start of the engine 2 first without immediately actuating an actuator to switch the traveling mode (a restart preferential section). After the restart of the engine 2 is completed, the ECU 21 actuates a predetermined actuator and performs switching of the traveling mode. The engine start at this point may be immediately performed at a point in time when the mode selection switch 22 is operated or may be performed after the restart conditions are satisfied.

In any case, first, the electric power of the battery is consumed by the actuation of the cell motor and, thereafter, the electric power is consumed by the actuation of the actuator for the switching of the traveling mode. However, since power generation of an alternator is resumed after the engine start, it is possible to actuate the actuator while preventing power shortage from occurring with generated power and discharged power from the battery. Therefore, it is possible to prevent a situation of the engine start impossibility due to the power shortage of the battery. It is possible to more surely start the vehicle 1 on the rough road.

On the other hand, rather than restarting the engine 2 earlier than the switching of the traveling mode as explained above, the engine 2 may be immediately restarted when the mode selection switch 22 is operated in the automatic stop of the engine 2 (a forced restart section). When the driver reselects the traveling mode through the switching operation of the mode selection switch 22, it can be regarded that the vehicle 1 is highly likely to be started soon by the traveling mode after the selection. In this case, for example, even if the restart conditions such as the brake OFF are not satisfied, it is possible to quickly complete the start of the engine 2 at earlier timing when the mode selection switch 22 is switch-operated. Therefore, it is possible to more smoothly start the vehicle 1 without causing slowness due to a start delay of the engine 2.

The embodiment is explained above. However, the aspect of the present invention is not limited to the embodiment. For example, in the embodiment, the present invention is embodied as the control device for the part-time type four-wheel drive vehicle including the 2WD/4WD switching mechanism 15, the center lock mechanism 16, the free wheel hub 18, the sub-reduction gear 4, and the rear lock mechanism 19. However, the present invention is not limited to this. Any one of the devices may be omitted or other devices may be added. For example, the present invention may be embodied as a rear-wheel drive vehicle (a two-wheel drive vehicle) including a rear lock device in the rear differential gear 12 or may be embodied as a control device for a full-time type four-wheel drive vehicle that always distributes an engine output from the center differential gear 6 to the front wheels 7f and the rear wheels 7r. The present invention may be embodied as a control device that does not always need to implement the neutral control and implements only the idling stop control.

In the embodiment, both of the implementation of the idling stop control and the implementation of the neutral control are permitted in the 2H mode and the 4H mode, the implementation of the idling stop control is prohibited and the implementation of the neutral control is permitted in the 4HLc mode, and both of the implementation of the idling stop control and the implementation of the neutral control are prohibited in the 4LLc mode. However, the traveling mode of the present invention is not limited to these modes. Any one of the traveling modes may be omitted or other traveling modes may be added. The traveling mode for permitting/prohibiting the implementation of the idling top control and the neutral control may be changed.

For example, it is also possible that both of the implementation of the idling stop control and the implementation of the neutral control are permitted in the 2H mode, the implementation of the idling stop control is prohibited and the implementation of the neutral control is permitted in the 4H mode, and both of the implementation of the idling stop control and the implementation of the neutral control are prohibited in the 4HLc mode and the 4LLc mode. When the 4H mode is selected, compared with when the 2H mode is selected, it can be regarded that the driver puts more importance on the traveling performance on the rough road. It is possible to obtain action and effects equivalent to the 4HLc mode in the embodiment by prohibiting only the idling stop control in the 4H mode.

What is claimed is:

1. A vehicle control device comprising:
   a mode switching section that switches a transmission state of an engine output to driving wheels of the vehicle between at least two modes, that is, a first traveling mode and a second traveling mode;
   an idling-stop control section that automatically stops the engine when a predetermined stop condition is satisfied and restarts the automatically stopped engine when a predetermined restart condition is satisfied; and a permitting/prohibiting section that permits the automatic stop of the engine by the idling-stop control section when the transmission state is switched to the first traveling mode by the mode switching section and prohibits the automatic stop of the engine by the idling-stop control section when the transmission state is switched to the second traveling mode by the mode switching section, wherein the vehicle is a vehicle including a lock mechanism capable of limiting a differential motion between front and rear wheels or left and right wheels, the first traveling mode is an unlock mode for allowing the differential motion between the front and rear wheels or the left and right wheels with the lock mechanism, and the second traveling mode is a lock mode for limiting the differential motion between the front and rear wheels or the left and right wheels with the lock mechanism.

2. The vehicle control device according to claim 1, wherein the mode switching section switches between at least the two modes according to operation of an input member by a driver of the vehicle, and comprising a restart preferential section that, when the input member is switch-operated by the driver in the automatic stop of the engine by the idling-stop control section, causes the idling-stop control section to restart the engine and thereafter causes the mode switching section to implement switching of the traveling mode corresponding to the operation of the input member.

3. The vehicle control device according to claim 2, comprising a forced restart section that, when the input member is switch-operated by the driver in the automatic stop of the engine by the idling-stop control section, even when the restart condition is not satisfied, forcibly causes the idling-stop control section to restart the engine.

4. The vehicle control device according to claim 1, wherein the mode switching section switches between at least the two modes according to operation of an input member by a driver of the vehicle, and comprising a forced restart section that, when the input member is switch-operated by the driver in the automatic stop of the engine by the idling-stop control section, even when the restart condition is not satisfied, forcibly causes the idling-stop control section to restart the engine.

5. The vehicle control device according to claim 1, wherein the vehicle is a vehicle including a sub-reduction gear switchable between a high gear and a low gear, the vehicle control device comprises a neutral control section that controls a transmission of the vehicle to a neutral state during the stop of the vehicle, and the permitting/prohibiting section permits implementation of the neutral control in a high gear mode in which the sub-reduction gear is switched to a high gear side and prohibits the implementation of the neutral control in a low gear mode in which the sub-reduction gear is switched to a low gear side.

6. The vehicle control device according to claim 1, wherein the vehicle is a vehicle capable of selecting a two-wheel drive mode and a four-wheel drive mode and including a center lock mechanism capable of limiting a differential motion of a center differential gear as the lock mechanism, the first traveling mode is an unlock mode for allowing the differential motion of the center differential gear with the center lock mechanism, and the second traveling mode is a lock mode for limiting the differential motion of the center differential gear with the center lock mechanism.

7. The vehicle control device according to claim 6, wherein the mode switching section switches between at least the two modes according to operation of an input member by a driver of the vehicle, and comprising a restart preferential section that, when the input member is switch-operated by the driver in the automatic stop of the engine by the idling-stop control section, causes the idling-stop control section to restart the engine and thereafter causes the mode switching section to implement switching of a traveling mode corresponding to the operation of the input member.

8. The vehicle control device according to claim 7, comprising a forced restart section that, when the input member is switch-operated by the driver in the automatic stop of the engine by the idling-stop control section, even when the restart condition is not satisfied, forcibly causes the idling-stop control section to restart the engine.

9. The vehicle control device according to claim 6, wherein the mode switching section switches between at least the two modes according to operation of an input member by a driver of the vehicle, and comprising a forced restart section that, when the input member is switch-operated by the driver in the automatic stop of the engine by the idling-stop control section, even when the restart condition is not satisfied, forcibly causes the idling-stop control section to restart the engine.

10. The vehicle control device according to claim 1, wherein the vehicle is a vehicle including a rear lock mechanism capable of limiting a differential motion of a rear differential gear as the lock mechanism, the first traveling mode is an unlock mode for allowing the differential motion of the rear differential gear with the rear lock mechanism, and the second traveling mode is a lock mode for limiting the differential motion of the rear differential gear with the rear lock mechanism.

11. The vehicle control device according to claim 10, wherein the mode switching section switches between at least the two modes according to operation of an input member by a driver of the vehicle, and comprising a restart preferential section that, when the input member is switch-operated by the driver in the automatic stop of the engine by the idling-stop control section, causes the idling-stop control section to restart the engine and thereafter causes the mode switching section to implement switching of a traveling mode corresponding to the operation of the input member.

12. The vehicle control device according to claim 11, comprising a forced restart section that, when the input member is switch-operated by the driver in the automatic stop of the engine by the idling-stop control section, even when the restart condition is not satisfied, forcibly causes the idling-stop control section to restart the engine.

13. The vehicle control device according to claim 10, wherein
the mode switching section switches between at least the two modes according to operation of an input member by a driver of the vehicle, and
comprising a forced restart section that, when the input member is switch-operated by the driver in the automatic stop of the engine by the idling-stop control section, even when the restart condition is not satisfied, forcibly causes the idling-stop control section to restart the engine.

14. A vehicle control device comprising:
a mode switching section that switches, according to operation of an input member by a driver of a vehicle, a transmission state of an engine output to driving wheels of the vehicle between at least two modes, that is, a first traveling mode and a second traveling mode;
an idling-stop control section that automatically stops the engine when a predetermined stop condition is satisfied and restarts the automatically stopped engine when a predetermined restart condition is satisfied; and
a permitting/prohibiting section that permits the automatic stop of the engine by the idling-stop control section when the transmission state is switched to the first traveling mode by the mode switching section and prohibits the automatic stop of the engine by the idling-stop control section when the transmission state is switched to the second traveling mode by the mode switching section, wherein
the vehicle is a vehicle including a sub-reduction gear switchable between a high gear and a low gear in a four-wheel drive mode,
the first traveling mode is a high gear mode in which the sub-reduction gear is switched to a high gear side, and
the second traveling mode is a low gear mode in which the sub-reduction gear is switched to a low gear side, and
comprising a restart preferential section that, when the input member is switch-operated by the driver in the automatic stop of the engine by the idling-stop control section, causes the idling-stop control section to restart the engine and thereafter causes the mode switching section to implement switching of a traveling mode corresponding to the operation of the input member.

15. The vehicle control device according to claim 14, comprising a forced restart section that, when the input member is switch-operated by the driver in the automatic stop of the engine by the idling-stop control section, even when the restart condition is not satisfied, forcibly causes the idling-stop control section to restart the engine.

16. A vehicle control device comprising:
a mode switching section that switches, according to operation of an input member by a driver of a vehicle, a transmission state of an engine output to driving wheels of the vehicle between at least two modes, that is, a first traveling mode and a second traveling mode;
an idling-stop control section that automatically stops the engine when a predetermined stop condition is satisfied and restarts the automatically stopped engine when a predetermined restart condition is satisfied; and
a permitting/prohibiting section that permits the automatic stop of the engine by the idling-stop control section when the transmission state is switched to the first traveling mode by the mode switching section and prohibits the automatic stop of the engine by the idling-stop control section when the transmission state is switched to the second traveling mode by the mode switching section, wherein
the vehicle is a vehicle including a sub-reduction gear switchable between a high gear and a low gear in a four-wheel drive mode,
the first traveling mode is a high gear mode in which the sub-reduction gear is switched to a high gear side, and
the second traveling mode is a low gear mode in which the sub-reduction gear is switched to a low gear side, and
comprising a forced restart section that, when the input member is switch-operated by the driver in the automatic stop of the engine by the idling-stop control section, even when the restart condition is not satisfied, forcibly causes the idling-stop control section to restart the engine.

* * * * *